US008963693B2

(12) United States Patent
Lo et al.

(10) Patent No.: US 8,963,693 B2

(45) Date of Patent: Feb. 24, 2015

(54) SYSTEM AND METHOD FOR CONTROLLING MEETING RESOURCES

(71) Applicant: Dell Products L.P., Round Rock, TX (US)

(72) Inventors: Yuan-Chang Lo, Austin, TX (US); Jason A. Shepherd, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 176 days.

(21) Appl. No.: 13/779,040

(22) Filed: Feb. 27, 2013

(65) Prior Publication Data

US 2014/0240098 A1 Aug. 28, 2014

(51) Int. Cl.
*H04Q 5/22* (2006.01)
*G08C 17/02* (2006.01)

(52) U.S. Cl.
CPC ............ *G08C 17/02* (2013.01); *G08C 2201/93* (2013.01)
USPC ... 340/10.5; 340/10.32; 340/10.4; 348/14.01; 348/14.16

(58) Field of Classification Search
CPC ....................................................... G08C 17/02
USPC ........ 340/10.5, 10.32, 10.4; 348/14.01, 14.16
See application file for complete search history.

(56) References Cited

U.S. PATENT DOCUMENTS

| | | | | |
|---|---|---|---|---|
| 7,447,608 | B1 * | 11/2008 | Poston et al. | 702/178 |
| 8,219,027 | B2 | 7/2012 | Appleby et al. | |
| 8,466,952 | B2 * | 6/2013 | Samadani et al. | 348/14.16 |
| 8,581,956 | B2 * | 11/2013 | Robinson et al. | 348/14.06 |
| 2011/0102301 | A1 * | 5/2011 | Jeon et al. | 345/3.1 |
| 2012/0185291 | A1 | 7/2012 | Ramaswamy et al. | |
| 2012/0315848 | A1 | 12/2012 | Smith et al. | |
| 2012/0322370 | A1 | 12/2012 | Lee | |

* cited by examiner

*Primary Examiner* — Tai T Nguyen

(74) *Attorney, Agent, or Firm* — Winstead PC

(57) ABSTRACT

A method of controlling a plurality of meeting room resources. The method includes initiating, via a host information handling system, an application, creating, via the application, a plurality of preferences, and establishing, by the host information handling system, a connection with a configuration device via a first close range communication path. The method also includes transferring at least one of the plurality of preferences, via the first close range communication path to the configuration device. The configuration device transmits, via a second close range communication path, a control message based on at least one of the plurality of preferences, to control at least one of the plurality of meeting room resources.

18 Claims, 3 Drawing Sheets

SYSTEM AND METHOD FOR CONTROLLING MEETING RESOURCES

BACKGROUND

1. Technical Field

The present invention relates generally to pervasive computing and more particularly, but not by way of limitation, to systems and methods for controlling meeting room resources in an automated manner.

2. History of Related Art

A variety of calendaring and notification applications exist for scheduling a multi-party meeting. Along with capabilities included in each are a number of limitations. For example, many web portals offer registered users an ability to maintain a calendar for their personal use. While such calendars are accessible from substantially any point from which a user can access a web browser, such calendars are limited in that the calendars can be viewed only by the registered user.

Programs such as Microsoft Outlook® and Lotus Notes® offer a variety of calendar specific capabilities as well as a number of associated functions such as, for example, an ability to organize meetings, including managing invitee lists. However, like their web portal counterparts, such applications are also burdened by limitations. For example, Microsoft Outlook® permits users to share their calendar with delegates, however, Microsoft Outlook® does not control and/or initiate meeting room resources such as, for example, projectors and the like. Moreover, these calendaring and notification applications do not communicate with the meeting room resources. As a result, an organizer has to arrive early in order to prepare the meeting room resources for the meeting. For example, the organizer has to manually activate the meeting room resources and manually dial into a conference call.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A method of controlling a plurality of meeting room resources. The method includes initiating, via a host information handling system, an application, creating, via the application, a plurality of preferences, and establishing, by the host information handling system, a connection with a configuration device via a first close range communication path. The method also includes transferring at least one of the plurality of preferences, via the first close range communication path to the configuration device. The configuration device transmits, via a second close range communication path, a control message based on at least one of the plurality of preferences, to control at least one of the plurality of meeting room resources.

An information handling system. The information handling system includes a network interface operable to enable connections thereto and a processing unit communicably coupled to the network interface. The processing unit is operable to initiate an application, create a plurality of preferences, establish a connection with a configuration device via the network interface, and transfer at least one of the plurality of preferences to the configuration device via the network interface. The configuration device transmits a control message based on the at least one of the plurality of preferences, to at least one of a plurality of meeting room resources.

A computer-program product includes a computer-usable medium having computer-readable program code embodied therein. The computer-readable program code is adapted to be executed to implement a method. The method includes initiating an application via a host information handling system, creating a plurality of preferences via the application, and establishing, by the host information handling system, a connection with a configuration device via a first close range communication path. The method further includes transferring at least one of the plurality of preferences, via the first close range communication path to the configuration device. The configuration device transmits, via a second close range communication path, a control message based on at least one of the plurality of preferences, to control at least one of the plurality of meeting room resources.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Calendaring and notification applications do not communicate with meeting room resources. As a result, an individual has to arrive early in order to prepare the meeting room resources for the meeting. For example, the individual has to manually activate the meeting room resources such as, for example, turning on a projector, connecting the projector with other devices, and manually dialing into a conference call. In addition, after the meeting concludes, the individual has to manually deactivate the meeting room resources. On many instances, ending the meeting properly is often neglected. As a result, the meeting room resources are left running resulting in wasted energy, reduced life of the meeting room resources, and potentially exposing a security risk by leaving a conference bridge on and a wireless projector connection open.

Figure 1:
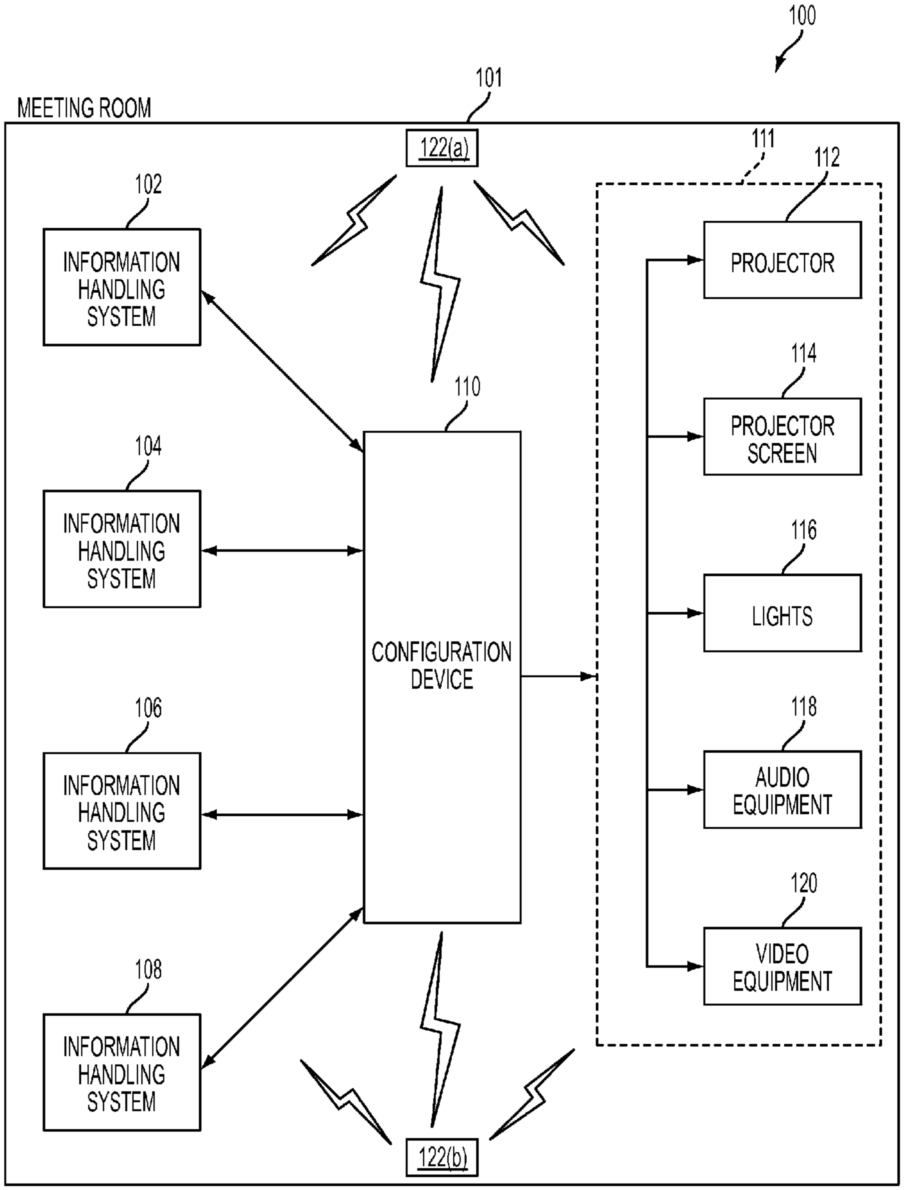
FIG. 1 is a schematic view illustrating of a system for controlling conference room resources.

FIG. 1 illustrates a schematic view illustrating a system for controlling meeting room resources. The system 100 is incorporated within a meeting room 101 and includes a plurality of information handling systems 102, 104, 106, 108. The system 100 also includes a configuration device 110 and a plurality of meeting room resources 111. For exemplary purposes, only one configuration device 110 is illustrated; however, in other embodiments, any number of configuration devices may be utilized depending on system requirements. For example, each of the plurality of meeting room resources 111 may have a dedicated configuration device. In some embodiments, the configuration device 110 may be integrated into the plurality of meeting room resources 111. In a typical embodiment, the plurality of meeting room resources 111 may include, for example, a projector 112, a projector screen 114, lights 116, at least one audio conferencing equipment 118, at least one video conferencing equipment 120, and the like. The system 100 also includes a plurality of tags 122(*a*), 122(*b*) installed at various locations within the meeting room 101.

The plurality of tags 122(*a*), 122(*b*) are configured for close range communication with the plurality of information handling systems 102, 104, 106, 108, the configuration device 110, and the meeting room resources 111. For purposes of this patent application, the term close range communication refers to wireless communication by devices equipped with wireless communication functionality that are in close range of each other. Close range is from approximately 1 centimeter to approximately 10 meters.

In a typical embodiment, the plurality of tags 122(*a*), 122 (*b*) are configured to store commands to control at least one function of the plurality of information handling systems 102, 104, 106, 108 within a specific location. For example, when an individual enters the meeting room 101 with at least one information handling system 102, 104, 106, 108, at least one command stored in the plurality of tags 122(*a*), 122(*b*) may be, for example, to switch an incoming call alert mode of the at least one information handling system 102, 104, 106, 108 to a vibrate mode via close range communication between the plurality of tags 122(*a*), 122(*b*) and least one information handling system 102, 104, 106, 108. In another example, when an individual enters the meeting room 101 with the at least one information handling system 102, 104, 106, 108, at least another command stored in the plurality of tags 122(*a*), 122(*b*) may be, for example, to turn off a camera of the at least one information handling system 102, 104, 106, 108 via close range communication between the plurality of tags 122(*a*), 122(*b*) and the least one information handling system 102, 104, 106, 108. In other embodiments, any one of a sound input module, an output module, a display, a light output device, and a data transmission and receiving module of the at least one information handling system 102, 104, 106, 108 may be enabled or disabled in response to stored commands sent by the plurality of tags 122(*a*), 122(*b*).

For exemplary purposes, the information handling system 102 will be referred to as a host system that is utilized by a meeting organizer, while the information handling systems 104, 106, 108 will be referred to as participant systems. In a typical embodiment, the plurality of information handling systems 102, 104, 106, 108 are configured for close range communication with the configuration device 110. In a typical embodiment, the plurality of information handling systems 102, 104, 106, 108 may be, for example, a mobile phone, a laptop computer, a tablet computer, a personal digital assistant (PDA), a netbook computer, and the like.

In a typical embodiment, the plurality of information handling systems 102, 104, 106, 108, the configuration device 110, the plurality of tags 122(*a*), 122(*b*), and the plurality of meeting room resources 111 may include, for example, close range communication functionality for communication with each other. In some embodiments, communication between the plurality of information handling systems 102, 104, 106, 108, the configuration device 110, the plurality of tags 122(*a*), 122(*b*), and the plurality of meeting room resources 111 may occur via, for example, a proxy device. For example, close range communication functionality may be, for example, Bluetooth functionality, near-field communication (NFC) functionality, ZigBee functionality, Zwave functionality, Wireless USB functionality, and the like. In other embodiment, the plurality of information handling systems 102, 104, 106, 108, the configuration device 110, the plurality of tags 122(*a*), 122(*b*), and the plurality of meeting room resources 111 may include, for example, Wi-Fi and Wi-Fi Direct functionality. In some embodiments, the configuration device 110 maintains connection credentials that are used by the plurality of information handling systems 102, 104, 106, 108 and the plurality of meeting room resources 111 to establish connection. The connection credentials can include, for example, a SSID, a wireless password (e.g., a pre-shared key), a shared secret, and other similar information that is used to establish connections. The plurality of information handling systems 102, 104, 106, 108 also include a close range message generation application that is capable of, for example, receiving input commands, creating close range messages, and creating meeting preferences. Once a close range message is generated, the close range message is transmitted from the plurality of information handling systems 102, 104, 106, 108 to the configuration device 110 via NFC, Bluetooth, and the like.

In a typical embodiment, the configuration device 110 may be, for example, a mobile phone, a laptop computer, a tablet computer, a personal digital assistant (PDA), a netbook computer, a server, a multi-point conferencing unit (MCU), and the like. Once the close range message is received by the configuration device 110, the configuration device 110 generates a control message. In a typical embodiment, the control message includes an application specific task that controls the plurality of meeting room resources 111. In a typical embodiment, the plurality of meeting room resources 111 may include, for example, the projector 112, the projector screen 114, lights 116, the at least one audio conferencing equipment 118, the at least one video conferencing equipment 120, and the like.

In a typical embodiment, the meeting organizer utilizes the information handling system 102 (host system) to execute a customizable conferencing application to send meeting invitations to the meeting participants prior to the meeting. In a typical embodiment, the meeting invitations include information required for joining the meeting. The information may be, for example, a URL link, a password, conference call information, a meeting start time, a meeting end time, a location of the meeting, a calendar reservation for the meeting, phone numbers for the meeting participants, and the like. Upon entering the meeting room 101, the meeting organizer utilizes the close range message generation application on the information handling system 102 to transfer a plurality of meeting preferences and the meeting information to the configuration device 110. In a typical embodiment, the transfer of information between the information handling system 102 and the configuration device 110 occurs via close range communication such as, for example, Bluetooth, NFC, and the like. In other embodiments, the transfer of information between the information handling system 102 and the configuration device 110 occurs via the plurality of tags 122(*a*), 122(*b*).

In a typical embodiment, the meeting preferences may be created by the meeting organizer and may include, for example, instructions to control the meeting resources 111 during the meeting. For example, at least one preference may be, for example, to activate the projector 112 (e.g., turn on the projector and establish a wireless presentation link) when at least one information handling system 102, 104, 106, 108 of the plurality of information handling systems 102, 104, 106, 108 is determined to be inside the meeting room 101. At least one preference may be to automatically deactivate the projector 112 (e.g., turn off the projector) when none of the information handling systems 102, 104, 106, 108 are determined to be inside the meeting room 101. Another preference may be, for example, to automatically lower the projector screen 114 when the projector is activated. Yet another preference may be, for example, to automatically activate the at least one audio conferencing equipment 118 (e.g., call a conference bridge for the meeting) and the at least one video conferencing equipment 120 (e.g., initiate a video conference session) when the projector is activated. Yet another preference may be, for example, to deactivate the meeting room resources 111 such as, for example, the projector 112, the lights 116, the at least one audio conferencing equipment 118, and the at least one video conferencing equipment 120 when none of the information handling systems 102, 104, 106, 108 are determined to be inside the meeting room 101. Upon successful reception of the preferences by the configuration device 110, the configuration device 110 sends control signals via, for example, close range communication to control the meeting room resources 111 as discussed above. In other embodiments, upon successful reception of the preferences by the configuration device 110, the configuration device 110 sends control signals via a wireless network such as, for example, Wi-Fi to control the meeting room resources 111.

In some embodiments, the configuration device 110 may be configured, for example, to send automatic meeting invitations to the meeting participants based on physical location proximity of the meeting participants to the meeting room 101. For example, when at least one meeting participant enters the meeting room 101 with the at least one information handling system 104, 106, 108, proximity of the at least one information handling system 104, 106, 108 near the meeting room 101 triggers addition of the at least one meeting participant to the meeting or triggers an invitation. If the at least one meeting participant is in a list of invitees, then the at least one meeting participant receives, for example, a notification on the at least one information handling system 104, 106, 108 to join the meeting. For example, proximity may trigger a pop up dialog on the at least one information handling system 104, 106, 108 of the at least one participant: "Do you want to join this meeting at location A?" The at least one participant clicks "Yes" and joins the meeting.

Close range communication functionality such as, for example, Bluetooth, NFC or other functionality is used to detect the proximity of the meeting participant's information handling system 104, 106, 108 to the meeting room 101. For example, the configuration device 110 which also functions as, for example, a conference phone in the meeting room 101, periodically scans for all close range communication enabled information handling systems 102, 104, 106, 108 in the proximity of the meeting room 101. In some embodiments, the configuration device 110 may be configured, for example, to place outgoing calls to meeting participants that are invited to the meeting but are not physically present in the meeting room 101.

Figure 2:
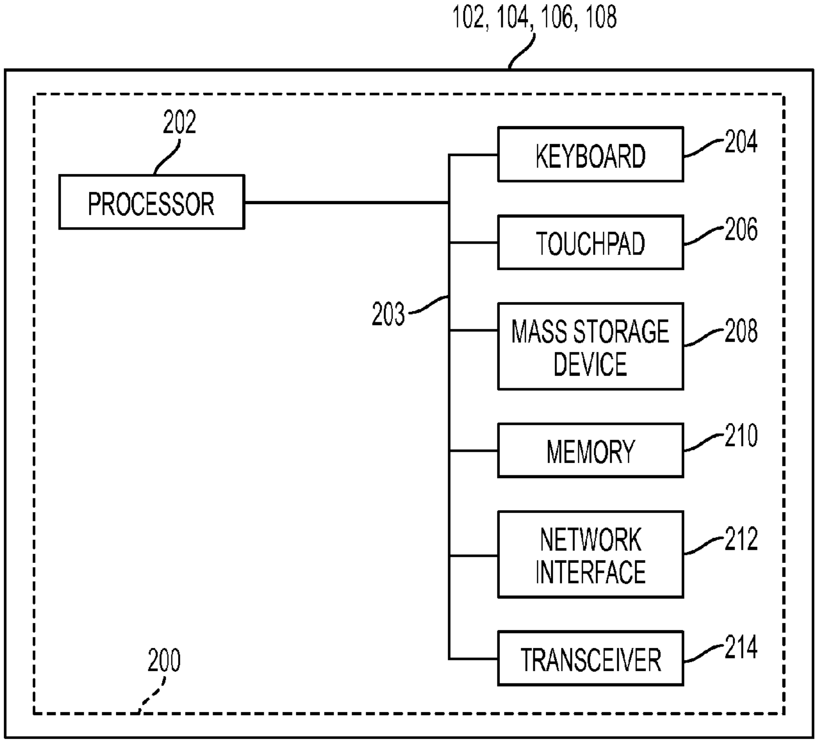
FIG. 2 is a schematic view illustrating processing circuitry of an information handling system.

FIG. 2 is a schematic view illustrating processing circuitry 200 of the information handling system 102, 104, 106, 108. The processing circuitry 200 includes a processor 202 connected to a bus 203. The bus 203 serves as a connection channel between the processor 202 and various other components of the information handling system 102, 104, 106, 108. User input/output devices such as, for example, a keyboard 204 and touchpad 206, are coupled to the processor 202. Further examples of input/output devices may include touchscreens, pointing trackballs, trackpads, and a variety of other input/output devices. Programs and data are stored on a mass storage device 208, coupled to the processor 202. Examples of the mass storage device 208 may include, for example, hard discs, optical disks, magneto-optical discs, solid-state storage devices, and a variety of other mass storage devices.

A system memory 210 is coupled to the processor 202 to provide the processor 202 with fast storage to facilitate execution by the processor 202. Examples of system memory 210 may include, for example, random access memory (RAM) devices such as dynamic RAM (DRAM), synchronous DRAM (SDRAM), solid state memory devices, and a variety of other memory devices. A network interface 212 is coupled to the processor 202. The network interface 212 is configured to establish network connection with other devices as discussed above relative to FIG. 1. In a typical embodiment, the network interface 212 is configured to communicate via close range communication standards such as, for example, NFC, Bluetooth, Wi-Fi, and the like with at least one of the configuration device 110, the plurality of tags 122(*a*), 122(*b*), and the plurality of meeting room resources 111. The processing circuitry 200 also includes a transceiver 214 for receiving and transmitting data.

Figure 3:
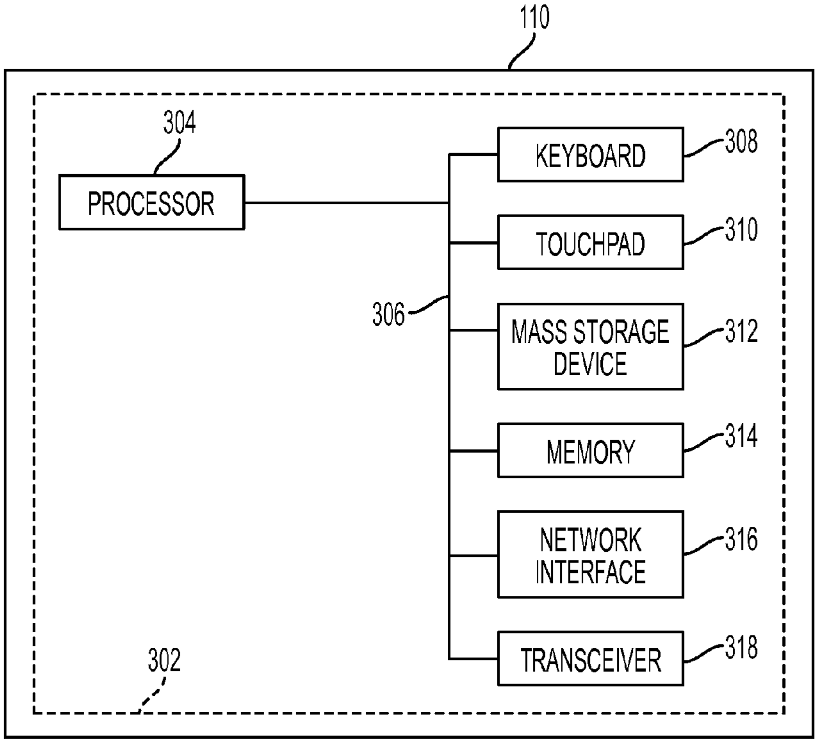
FIG. 3 is a schematic view illustrating processing circuitry of a configuration device.

FIG. 3 is a schematic view illustrating processing circuitry 302 of the configuration device 110. The processing circuitry 302 of the configuration device 110 is similar in construction to the processing circuitry 200 of the information handling system 102, 104, 106, 108 illustrated in FIG. 2. The processing circuitry 302 includes a processor 304 connected to a bus 306. The bus 306 serves as a connection channel between the processor 304 and various other components of the configuration device 110 such as, for example, a keyboard 308, a touchpad 310, a mass storage device 312, a system memory 314, a network interface 316, and a transceiver 318. In a typical embodiment, the network interface 316 is configured to communicate via close range communication standards such as, for example, NFC, Bluetooth, Wi-Fi, and the like with at least one of the information handling systems 102, 104, 106, 108 and the plurality of meeting room resources 111.

Figure 4:
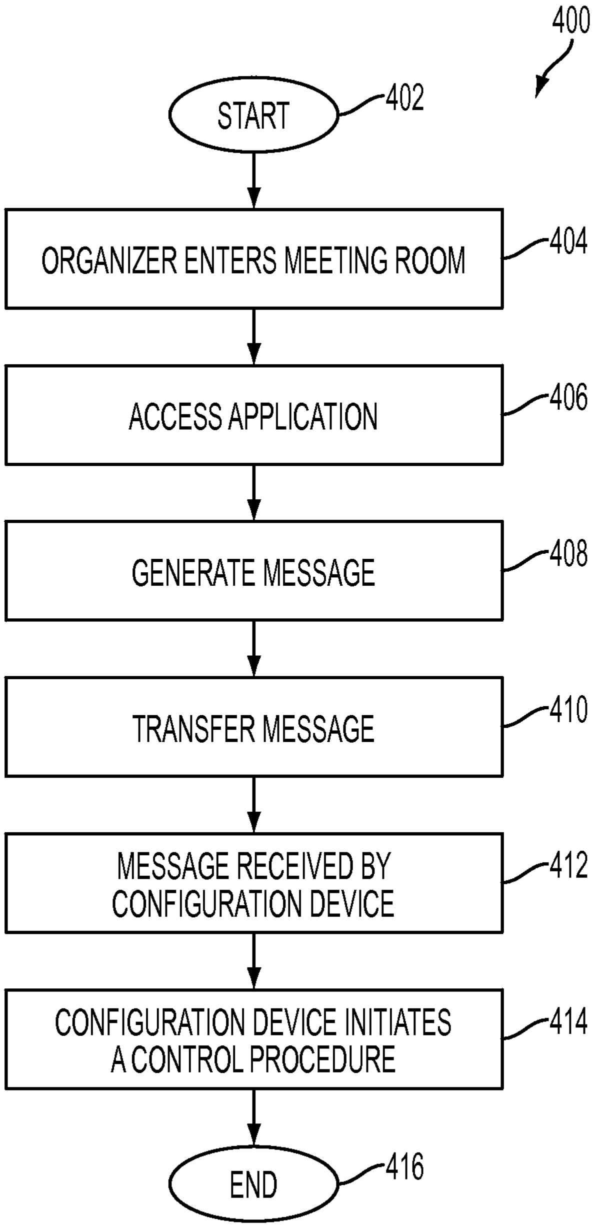
FIG. 4 is a flow illustrating a process for controlling the conference room resources.

FIG. 4 is a flow illustrating a process 400 for controlling meeting room resources. For illustrative purposes, the process 400 will be described relative to FIGS. 1-3. The process 400 starts at step 402. At step 404, the meeting organizer enter the meeting room 101. At step 406, the meeting organizer uses the information handling system 102 (host device) to access a close range message generation application and generates a close range message (step 408). In a typical embodiment, the close range message includes meeting information and preferences for controlling the meeting room resources 111. The meeting information may be, for example, a URL link, a password, conference call information, a meeting start time, a meeting end time, a location of the meeting, a calendar reservation for the meeting, phone numbers for the meeting participants, and the like.

In a typical embodiment, the meeting preferences may be created by the meeting organizer and may include, for example, instructions to control the meeting resources 111 during the meeting. For example, at least one preference may be, for example, to activate the projector 112 when at least one information handling system 102, 104, 106, 108 of the plurality of information handling systems 102, 104, 106, 108 is determined to be inside the meeting room 101. At least one preference may be to automatically deactivate the projector 112 when none of the information handling systems 102, 104, 106, 108 are determined to be inside the meeting room 101. Another preference may be, for example, to automatically lower the projector screen 114 when the projector is activated. Yet another preference may be, for example, to automatically activate the at least one audio conferencing equipment 118 and the at least one video conferencing equipment 120 when the projector is activated. Yet another preference may be, for example, to deactivate the meeting room resources 111 such as, for example, the projector 112, the lights 116, the at least one audio conferencing equipment 118, and the at least one video conferencing equipment 120 when none of the information handling systems 102, 104, 106, 108 are determined to be inside the meeting room 101. Upon successful reception of the preferences by the configuration device 110, the configuration device 110 sends control signals via close range communication to control the meeting room resources 111 as discussed above.

At step 410, the meeting organizer transfers the meeting preferences and the meeting information to the configuration device 110. In a typical embodiment, the transfer of information between the information handling system 102 and the configuration device 110 occurs via close range communication functionality. Close range communication functionality may be, for example, Bluetooth, NFC, and the like. At step 412, the configuration device 110 receives the close range message from the information handling system 102. At step 414, the configuration device 110 generates a control message. In a typical embodiment, the control message includes an application specific task that controls the plurality of meeting room resources 111. From step 414, the process 400 ends at step 416.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), configuration device (e.g., blade configuration device or rack configuration device), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchpad touchscreen and/or a video display. The information handling system may also include one or more buses operable to transmit communications between the various hardware components.

It is thus believed that the operation and construction of embodiments of the present invention will be apparent from the foregoing description. While the method and system shown or described have been characterized as being preferred it will be obvious that various changes and modifications may be made therein without departing from the spirit and scope of the invention.

What is claimed is:

1. A method of controlling a plurality of meeting room resources, the method comprising:

initiating, via a host information handling system, an application;

creating, via the application, a plurality of preferences;

establishing, by the host information handling system, a connection with a configuration device via a first close range communication path;

transferring at least one of the plurality of preferences, via the first close range communication path to the configuration device;

wherein the configuration device transmits, via a second close range communication path, a control message based on at least one of the plurality of preferences, to control at least one of the plurality of meeting room resources; sending, by the host information handling system, meeting invitations to a plurality of meeting participants, wherein each meeting participant of the plurality of meeting participants is associated with a participant information handling system;

determining, via the configuration device, whether at least one of the participant information handling system is inside a meeting room; and responsive to a determination that the at least one participant information handling system is inside the meeting room, sending a meeting notification on the at least one participant information handling system.

2. The method of claim 1, wherein the control message comprises an application specific task that controls the at least one of the plurality of meeting room resources.

3. The method of claim 1, wherein the first close range communication path comprises communication via at least one of near-field communication (NFC), Bluetooth, ZigBee, Zwave, and Wireless USB.

4. The method of claim 1, wherein the second close range communication path comprises communication via at least one of near-field communication (NFC), Bluetooth, ZigBee, Zwave, and Wireless USB.

5. The method of claim 1, wherein the creating is performed by a meeting organizer.

6. The method of claim 1, wherein the plurality of meeting room resources comprise at least one of a projector, a projector screen, lights, at least one audio equipment, and at least one video equipment.

7. The method of claim 1, wherein the host information handling system is associated with a meeting organizer.

8. The method of claim 1, wherein at least one preference of the plurality of preferences comprises automatically activating the plurality of meeting room resources when at least one of the host information handling system and the participant information handling system is determined to be in a meeting room.

9. The method of claim 1, wherein at least one preference of the plurality of preferences comprise automatically deactivating the plurality of meeting room resources when the host information handling system and the participant information handling system are determined to not be in a meeting room.

10. The method of claim 1, further comprising:

determining, via the configuration device, whether at least one participant information handling system is inside a meeting room; and responsive to a determination that the at least one participant information handling system is not inside the meeting room, placing, by the configuration device, an outgoing call to the at least one participant information handling system.

11. The method of claim 1, further comprising:

controlling, via at least one of the first close range communication path and the second close range communication path, at least one function of the host information handling system.

12. An information handling system comprising:

a network interface operable to enable connections thereto;

a processing unit communicably coupled to the network interface, wherein the processing unit is operable to:

initiate an application;

create a plurality of preferences;

establish a connection with a configuration device via the network interface;

transfer at least one of the plurality of preferences to the configuration device via the network interface;

wherein the configuration device transmits a control message based on the at least one of the plurality of preferences, to at least one of a plurality of meeting room resources; sending, by the host information handling system, meeting invitations to a plurality of meeting participants, wherein each meeting participant of the plurality of meeting participants is associated with a participant information handling system;

determining, via the configuration device, whether at least one of the participant information handling system is inside a meeting room; and responsive to a determination that the at least one participant information handling system is inside the meeting room, sending a meeting notification on the at least one participant information handling system.

13. The information handling system of claim 12, wherein the network interface is operable to communicate via near-field communication (NFC).

14. The information handling system of claim 12, wherein the network interface is operable to communicate via Bluetooth.

15. The information handling system of claim 12, wherein the control message comprises an application specific task that controls the at least one of the plurality of meeting room resources.

16. The information handling system of claim 15, wherein the plurality of meeting room resources comprise at least one of a projector, a projector screen, lights, at least one audio equipment, and at least one video equipment.

17. The information handling system of claim 15, wherein the information handling system is associated with a meeting organizer.

18. A non-transitory computer-program product comprising a medium having computer-readable program code embodied therein, the computer-readable program code adapted to be executed to implement a method comprising:

initiating an application via a host information handling system;

creating a plurality of preferences via the application;

establishing, by the host information handling system, a connection with a configuration device via a first close range communication path;

transferring at least one of the plurality of preferences, via the first close range communication path to the configuration device;

wherein the configuration device transmits, via a second close range communication path, a control message based on at least one of the plurality of preferences, to control at least one of the plurality of meeting room resources; sending, by the host information handling system, meeting invitations to a plurality of meeting participants, wherein each meeting participant of the plurality of meeting participants is associated with a participant information handling system;

determining, via the configuration device, whether at least one of the participant information handling system is inside a meeting room; and responsive to a determination that the at least one participant information handling system is inside the meeting room, sending a meeting notification on the at least one participant information handling system.

* * * * *